INVENTOR.
DONALD S. HEIDTMANN
BY Radford M. Reams
HIS ATTORNEY

United States Patent Office 3,483,719
Patented Dec. 16, 1969

3,483,719
CONTROL FOR ELECTROMAGNETIC CLUTCH
Donald S. Heidtmann, Louisville, Ky., assignor to General Electric Company, a corporation of New York
Filed Nov. 14, 1967, Ser. No. 682,777
Int. Cl. D06f 33/00; F16d 37/02
U.S. Cl. 68—12                          7 Claims

ABSTRACT OF THE DISCLOSURE

A washing machine has an electromagnetic clutch with a semiconductor switch controlling the power to the clutch coil in response to a generated signal representative of the speed of the clutch output member. This signal is used to establish a platform voltage across a capacitor, connected to have a ramp voltage built on the platform voltage. The semiconductor switch is connected to the capacitor to be turned on when the total voltage across the capacitor reaches a predetermined level.

BACKGROUND OF THE INVENTION

This is an improved clutch control of the general type shown in my copending application Ser. No. 608,559, filed January 11, 1967; assigned to General Electric Company, assignee of the present invention.

My prior invention provided a high gain, fast response control for an electromagnetic clutch. In that control a signal generated by a tachometer is used to gate or turn on a semiconductor switch controlling the power to the clutch. That invention provides an excellent, general purpose clutch control and a control which works well in applications such as automatic washing machines.

Because of the drive systems used therein, some mechanisms such as automatic washing machines tend to have mechanical resonance. That is they tend to oscillate about a preselected operating speed. It is desirable to provide a control in such machines which provides the proper signal regardless of such resonance.

An object of this invention is to provide an improved clutch control of increased stability to minimize the effect of mechanical resonance of the associated mechanism.

In many applications it is desirable to change the sensitivity of the control between groups of similar machines, from machine to machine or from time to time for the same machine. That is, it is desirable to vary the degree of change in the generated signal necessary to go from clutch "full on" to clutch "full off." For instance, in some washing machine designs it may be desirable to have the control more sensitive for partial loads or intermediate speed operation than for full load or full speed operation. This is because changes in the clutch torque capability will have a more profound effect on the machine speed under partial load or intermediate speed conditions.

Another object of this invention is to provide an improved clutch control in which the sensitivity of the control may be varied effectively by only a minor change in component values.

SUMMARY OF THE INVENTION

In a washing machine having a rotable container to receive fluid and fabrics to be washed in the fluid, agitation means and power means for actuating the agitation means and rotating the container means for washing the fabrics and removing fluid from the fabrics, including an electromagnetic clutch having a coil for varying the torque capability of the clutch in response to the average current passing through the coil; there is provided a control circuit for connecting the coil to a source of pulsating electric energy. The circuit includes semiconductor switch means connected in power supply relationship to the coil. A voltage divider network is connected in the circuit and includes the collector to emitter path of a transistor. Generating means produces a signal responsive to the output speed of the clutch, which signal is applied to the base of the transistor. This provides a collector to emitter voltage for the transistor which is responsive to the output speed of the clutch. A capacitor is connected in the circuit to be provided with a pedestal voltage responsive to the value of the collector to emitter voltage and a ramp voltage above the pedestal voltage. Semiconductor means interconnects the capacitor and semiconductor switch means to gate the switch means in response to the charge on the capacitor reaching at least a predetermined total value.

DESCRIPTION OF THE PREFERRED EMBODIMENTS

Figure 1:
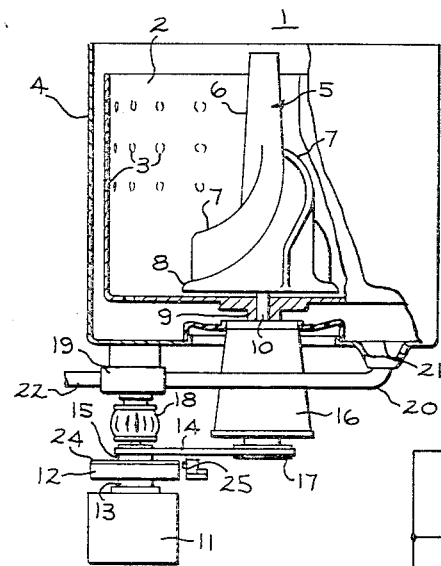
FIGURE 1 is a partial schematic front elevational view of a clothes washing machine adapted to utilize the new and improved control of this invention.

Turning now to FIGURE 1 of the drawing, there is shown, in schematic form, an agitator-type washing machine adapted to utilize a new and improved control in accordance with the present invention, the machine being generally indicated by the numeral 1. Machine 1 includes a clothes basket 2 having perforations 3 over its side and bottom walls and disposed within an outer, imperforate tub or casing 4, the basket 2 and tub 4 forming together fluid and clothes containing means. The entire structure generally is mounted within a suitable appearance and protective cabinet which, in this case, has been omitted for purposes of clarity. At the center of basket 2 there is provided a vertical axis agitator 5 which includes a center post 6 and a plurality of curved vanes 7, extending out from the center post and connected together at their base by a flared skirt 8. Both basket 2 and agitator 5 are movably mounted. Conventionally, the basket is mounted for rotation and the agitator is mounted for some type of oscillatory movement which will effect agitation of the fabrics and the fluid within the basket. In one conventional structure, the basket 2 may be secured to a hollow shaft 9, and the agitator may be secured to a shaft 10 which extends up within shaft 9 in rotatable relation thereto.

Basket 2 and agitator 5 are driven by a power means such as a reversible drive motor 11 through a drive including an electromagnetic clutch 12 mounted on the motor shaft 13. A suitable belt 14 transmits power from the output 15 of the clutch to a transmission assembly 16 through a pulley 17. Thus, depending upon the direction of motor rotation, pulley 17 of transmission 16 is driven in opposite directions.

Transmission 16 is so arranged that it supports and drives both shafts 9 and 10. When motor 11 is operated in one direction, the transmission causes agitator 5 to be oscillated by shaft 10. Conversely, when the motor is driven in the opposite direction, the transmission drives basket 2 and agitator 5 together at high speed by shafts 9 and 10 for centrifugal extraction of fluid from the fabrics.

In addition to operating transmission 16 through clutch 12, as described, motor 11 also provides a direct drive through a flexible coupling 18 to a pump structure generally indicated at 19. Pump 19 has an inlet which is connected by a conduit 20 to an opening 21 formed in the lower most portion of tube 4, and an outlet, which is connected by a conduit 22 to a suitable drain (not shown). When the motor is rotated in the direction to cause the basket 2 and agitator 5 to be rotated for centrifugal fluid extraction, the pump 19 is effective to withdraw fluid from tub 4 through opening 21 and discharge it through conduit 22 to drain. When the motor is operated in the other direction, that is to cause agitator 5 to be oscillated for effecting washing of fabrics within the fluid, the pump 19 is substantially ineffective.

In operation, the machine 1 is provided with an amount of water of suitable temperature through a conventional water supply mechanism (not shown). The motor 11 is then caused to rotate so as to result in agitator 5 being oscillated to cause fabrics in the machine to be agitated within the fluid. Thereafter the motor 11 is reversed so as to cause the agitator 5 and basket 2 to be rotated at high speed for centrifugally extracting the fluid from the fabrics. At the same time pump 19 is rotated so as to remove the vitiated fluid from the tub 4, and thence from the basket 2. This sequence of operation may be repeated a number of times; conventionally it is done at least three times to provide a prewash step, a wash step and a rinse step. The particular controls for providing such parameters as the number of steps, length of steps, variations in water temperature and automatic dispensing of such items as detergent, bleaches and rinse agents are quite conventional and form no part of the present invention. Therefore they have been omitted for the sake of simplicity.

Figure 2:
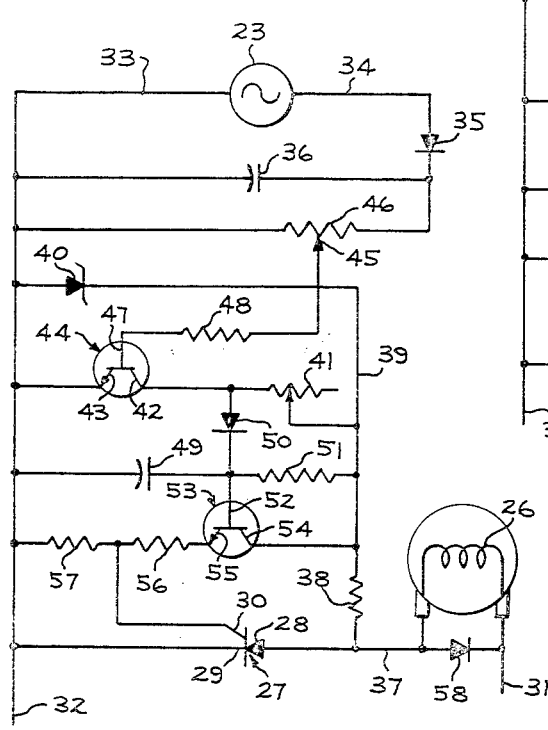
FIGURE 2 is a schematic electrical circuit diagram, illustrating one embodiment of the present invention.

Referring now to FIGURES 1 and 2 there is shown in schematic form a new and improved control for the electromagnetic clutch 12. A suitable tachometer generator 23 is driven at a speed representative of the output speed of the clutch, thereby developing an electrical potential or voltage which is representative of the angular velocity of the clutch output member 15. Preferably, the generator 23 is of the A.C., permanent-magnet, alternator type. In the particular machine illustrated in FIGURE 1 the generator includes a strip of magnetic material 24 which is mounted on the clutch output member and has alternate north and south poles, and a pickup 25 mounted adjacent the strip 24.

The clutch 12 includes a field coil 26 to vary the torque transmission capability or slippage of the clutch in response to the average current flow therethrough, as is common in electromagnetic clutches or coupling devices. By varying the current supply to the coil, the speed at which motor 11 will drive the agitator 5 and basket 2 may be controlled.

A controlled rectifier, preferably of the silicon controlled type, is shown at 27 and includes an anode 28, a cathode 29 and a gate 30. A pair of conductors 31 and 32 are provided to connect the coil 26 to a suitable source of pulsating electric energy (not shown), for instance the usual 110–120 volt A.C. domestic power. The conductor 31 may be considered the power conductor and the conductor 32 the neutral conductor. One side of the coil 26 is connected to the conductor 31 while the other side is connected to the conductor 32 in series with the anode 28 and cathode 29 of the controlled rectifier 27.

One terminal 33 of the tachometer generator 23 is connected to the neutral conductor 32 while the other terminal 34 is connected through a rectifier 35 and a filter capacitor 36 to the neutral conductor 32. Thus, a filtered D.C. voltage, representative of the A.C. voltage generated by tachometer 23 will appear across the capacitor 36.

In accordance with the present invention I provide a new and improved control circuit including the controlled rectifier 27 and the tachometer generator 23 for controlling the current through coil 26. As stated above, one side of the coil 26 is connected to the conductor 31 while the other side is connected to a conductor 37 leading to the anode 28 of the controlled rectifier. The conductor 37 is also connected to one side of a dropping resistor 38, the other side of the resistor being connected by a conductor 39 to one side of a Zener diode 40. The other side of the Zener diode is connected to neutral conductor 32 so that the dropping resistor 38 and Zener diode 40 function together to provide a stable reference voltage for my new and improved control.

As a part of my control I provide a voltage divider network including a variable resistance 41 and the collector 42 to emitter 43 path of a transistor 44. This voltage divider network is connected between conductor 39 and neutral conductor 32. The intermediate terminal 45 of a variable resistance 46, connected across filter capacitor 36, is connected to the base 47 of transistor 44 through a current limiting resistor 48. Thus the voltage produced by tachometer generator 23 is used to control the conductivity of the transistor 44. This in turn determines the percentage of the reference voltage appearing across the collector to emitter path of the transistor.

A capacitor 49 is connected across the collector to emitter path of transistor 44 is series with a rectifier 50 and is connected to conductor 39 through a charging resistance 51. The voltage divider formed by resistance 41 and the collector to emitter path of transistor 44; the capacitor 49, the rectifier 50, and resistance 51 form a ramp and pedestal circuit. For each half cycle of applied voltage of proper polarity (with the circuit shown, when conductor 31 is positive with respect to conductor 32) the voltage divider quickly provides the capacitor 49 with a pedestal voltage, the value of which depends upon the conductivity of the transistor 44. The capacitor thereafter is charged to a higher value by a ramp voltage provided through charging resistance 51. The diode 50 isolates the capacitor 49 from the voltage divider once the capacitor voltage reaches the collector to emitter voltage of the transistor. A more detailed explanation of the theory and operation of ramp and pedestal circuits is provided in the General Electric SCR Manual, third edition, section 8.4.2.

The junction of capacitor 49 and charging resistance 51 is connected to the base 52 of a second transistor 53, having its collector 54 connected to conductor 39 and its emitter connected to neutral conductor 32 through a pair of serially connected resistances 56 and 57. The gate 30 of the controlled rectifier 27 is connected to the juncture of the resistances 56 and 57. It will be recognized that transistor 53 is connected in the circuit in an emitter follower configuration. With this connection the transistor 53 will maintain an emitter voltage which is the same as the voltage of capacitor 49, less the nominal half volt drop from the base to the emitter within the transistor. The transistor conducts sufficient collector to emitter current flow to maintain this voltage. When the voltage on capacitor 49 has reached some predetermined level the collector to emitter current through transistor 53 will be sufficient to cause the controlled rectifier 27 to be gated so as to conduct current through the coil 26.

Assuming, for purposes of describing the operation of the system, that the machine of FIGURE 1 is at rest and motor 11 is energized to drive the input member of clutch 12. Initially the output member will not be turning and thus the tachometer generator 23 will be providing no voltage to capacitor 36. There will be no input signal to transistor 44 and the collector to emitter path thereof will exhibit an extremely high resistance. Therefore, during the half cycle when conductor 31 is positive with respect to conductor 32, most of the reference voltage between conductor 39 and conductor 32 will appear across the transistor and this relatively high voltage will be provided as a pedestal voltage to capacitor 49 through diode 50. The voltage on capacitor 49 is applied to the base 52 of the transistor 53 and causes a collector to emitter current of flow therethrough. Under normal conditions this current will be sufficient to gate the controlled rectifier 27. Thereafter, for the remainder of that half cycle, the controlled rectifier conducts from its anode to its cathode to provide a current through the clutch coil 26. As is usual in electromagnetic clutches this current through the clutch coil causes the input and the output of the clutch to be coupled so that the output begins to rotate.

As the output member of the clutch rotates, causing the machine 1 to be operated, the tachometer 23 generates an ever increasing signal. This causes an increasingly larger voltage to appear across the capacitor 36. A portion of this voltage, determined by the setting of intermediate terminal 45 of the variable resistance 46, causes a current to flow into the base 47 of transistor 44 through resistance 48. This means that on succeeding half cycles of proper polarity the collector 42 to emitter 43 portion of the voltage across the voltage divider is smaller and smaller. This results in the pedestal voltage provided to capacitor 49 being lowered so that an increasing ramp voltage must be added to provide a base voltage to transistor 53 sufficient to gate the controlled rectifier 27. In turn, this means that the controlled rectifier is gated increasingly later in each half cycle of proper polarity and less current is provided through the coil 26. Eventually an equilibrium condition is reached wherein the torque capability of the clutch, provided by the current through the coil 26 is insufficient to cause any faster operation of the washing machine 1.

Since the controlled rectifier 27 will conduct in one direction only, energization of the coil 26 from an A.C. type pulsating source will cause the clutch always to be de-energized during one-half of each cycle or applied power across the conductors 31 and 32, when operated from an A.C. source. In order to prevent erratic operation of the clutch, because of this half wave power, a rectifier 58 is connected across the coil 26 to act as a free wheeling diode and allow effective clutch operation from a half wave supply.

The intermediate terminal 45 may be utilized to vary the percentage of voltage across capacitor 36 which is used to apply a current to the base of transistor 44. Variation of the setting of terminal 45 will vary the platform voltage responsive to a particular output speed of clutch. In practice this variable resistance 46 conveniently may be used as a customer speed selection control. The resistance 41 is shown as being variable because it is a convenient way for providing factory calibration of the control circuit so as to compensate the circuit for various manufacturing tolerances of both the various elements of the circuit and the machine with which it is associated, so that the control provides the speed desired for each setting of the resistance 46.

This circuit is very stable with regard to the output speed of the clutch and will tend to provide the desired output speed regardless of slight variations in the speed of the machine caused by mechanical resonance of the elements of the machine. Also, by using the ramp and pedestal principal I have provided a magnetic clutch control in which the sensitivity may be varied easily. Since the speed with which the capacitor 49 is charged to the proper voltage for firing the controlled rectifier 27 depends upon the slope of the ramp voltage, merely changing the value of the charging resistance 51 will cause the sensitivity of the control to be varied. Therefore controls of various sensitivities may be provided merely by changing the value of this one element.

I have found that one suitable control for an automatic washing machine, for instance, can be provided with the following values.

| Reference numeral: | Value or type number |
|---|---|
| 27 | General Electric No. C106B. |
| 35 | 1N5059. |
| 36 | 2 microfarad, 15 v. |
| 38 | 22K ohms. |
| 40 | 1N1771. |
| 41 | 10K ohms, variable. |
| 44 | 2N2926. |
| 46 | 10K ohms, variable. |
| 48 | 10K ohms. |
| 49 | 0.1 microfarad. |
| 50 | 1N5059. |
| 51 | 270K omhs. |
| 53 | 2N2926. |
| 56 | 1K ohm. |
| 57 | 470 ohms. |
| 58 | 1N5059. |

Figure 3:
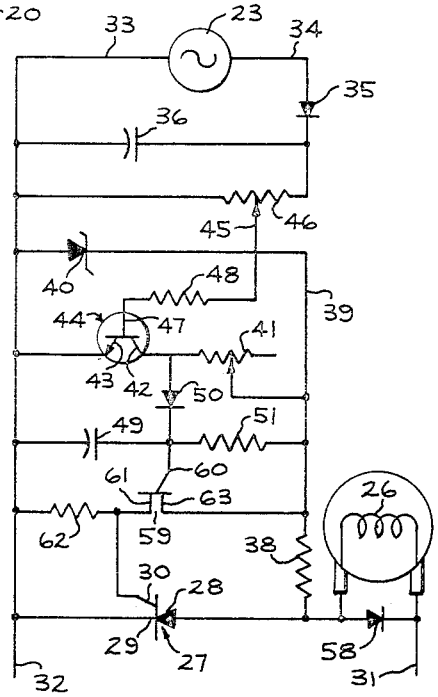
FIGURE 3 is a schematic electrical circuit diagram, illustrating another embodiment of the present invention.

Referring now to FIGURE 3, there is shown therein another embodiment of the present invention, having similar performance. The only difference between the control circuit of FIGURE 3 and that of FIGURE 2 is that the transistor 53 and its associated resistances 56 and 57 have been removed and replaced by a unijunction transistor 59 having its emitter 60 connected to the junction of charging resistance 51 and capacitor 49, one base 61 connected to neutral conductor 32 through a resistance 62 and its other base 63 connected to conductor 39. The gate 30 of the controlled rectifier 27 is connected to the junction of base 61 and resistance 62. As the capacitor 49 is charged, it provides an ever increasing voltage on the emitter 60. When this voltage becomes large enough it turns on the unijunction transistor and "dumps" the capacitor charge through the resistance 62. This provides a signal for gating the controlled rectifier 27 to provide energizing current to the coil 26. By comparing the circuits of FIGURES 2 and 3 it will be seen that FIGURE 2 provides a slowly increasing current which eventually turns on or gates the controlled rectifier 27 while the circuit of FIGURE 3 provides a pulse for turning on the controlled rectifier. With the values previously given for a circuit according to FIGURE 2, a 2N2646 unijunction transistor and a 100 ohm resistance at 62 will provide a suitable circuit in accordance with FIGURE 3.

What I claim as new and desire to secure by Letters Patent of the United States is:

1. In a washing machine having a rotatable container to receive fluid and fabrics to be washed in the fluid, agitation means, and power means for actuating the agitation means and rotating the container means to cause washing of the fabrics and extracting fluid from the fabrics, including an electromagnetic clutch having a coil for varying the torque capability of the clutch in response to the average current passing through the coil; a control circuit for connecting said coil to a source of pulsating electric energy comprising:
    (a) semiconductor switch means connected in said circuit in power supply relationship to said coil;
    (b) a voltage divider network connected in said circuit and including the colector to emitter path of a transistor;
    (c) generating means for producing a signal responsive to the output speed of said clutch for application to the base of said transistor to provide a collector to emitter voltage across said transistor representative of said output speed;
    (d) a capacitor connected in said circuit so as to be provided with a pedestal voltage responsive to said collector to emitter voltage and a ramp voltage above said pedestal voltage;
    (e) semiconductor means interconnecting said capacitor and said semiconductor switch means to gate said semiconductor switch means and provide energy to said coil in response to the voltage on said capacitor reaching a predetermined value;
    (f) whereby the average current through said coil is adjusted in response to changes in the output speed of the clutch so as to control the clutch torque to maintain a desired average output speed.

2. In a washing machine having a rotatable container to receive fluid and fabrics to be washed in the fluid, agitation means; and power means for actuating the agitation means and rotating the container means to cause washing of the fabrics and extracting fluid from the fabrics, including an electromagnetic clutch having a coil for varying the torque capability of the clutch in response to the average current passing through the coil; a control circuit for connecting said coil to a source of pulsating electric energy comprising:

(a) semiconductor switch means connected in said circuit in power supply relationship to said coil;
(b) a voltage divider network connected in said circuit and including the collector to emitter path of a transistor;
(c) generating means for sensing a speed responsive to the output speed of said clutch and producing a D.C. voltage representative thereof;
(d) means connecting said generating means to the base of said transistor to provide a collector to emitter voltage across said transistor representative of said output speed;
(e) a capacitor connected across said collector to emitter path to be provided with pedestal voltage responsive to said output speed, said capacitor also being connected in said circuit in series with a resistance to provide said capacitor with a ramp voltage above said pedestal voltage;
(f) semiconductor means interconnecting said capacitor and said semiconductor switch means to gate said semiconductor switch means and provide energy to said coil in response to the charge on said capacitor reaching a predetermined value; and
(g) whereby the average current through said coil is adjusted in response to changes in the output speed of the clutch so as to control the clutch torque to maintain a desired average output speed.

3. The invention as set forth in claim 2 wherein said capacitor is connected across said transistor collector to emitter path through a rectifier to isolate said capacitor from said transistor when the charge on said capacitor is greater than the collector to emitter voltage of said transistor.

4. The invention as set forth in claim 2 wherein said semiconductor means includes a transistor connected in said circuit in an emitter follower configuration between said capacitor and said semiconductor switch means.

5. The invention as set forth in claim 2 wherein said semiconductor means includes a unijunction transistor connected in the circuit between said capacitor and said semiconductor switch means.

6. The invention as set forth in claim 2, further including manually adjustable means for varying the signal provided to said base of said transistor in response to a predetermined output speed of said clutch thereby to vary the operational speed of the machine.

7. The invention as set forth in claim 2 wherein said voltage divider network includes a variable resistance connected in series with said collector to emitter path.

References Cited

UNITED STATES PATENTS

| | | | |
|---|---|---|---|
| 3,328,983 | 7/1967 | Brucken et al. | 68—12 |
| 3,403,538 | 10/1968 | Andrew et al. | 68—12 |

WILLIAM I. PRICE, Primary Examiner

U.S. Cl. X.R.

68—23.7; 192—84